W. GORDON.
HORSESHOE CALK.
APPLICATION FILED JAN. 20, 1912.
1,046,287.
Patented Dec. 3, 1912.
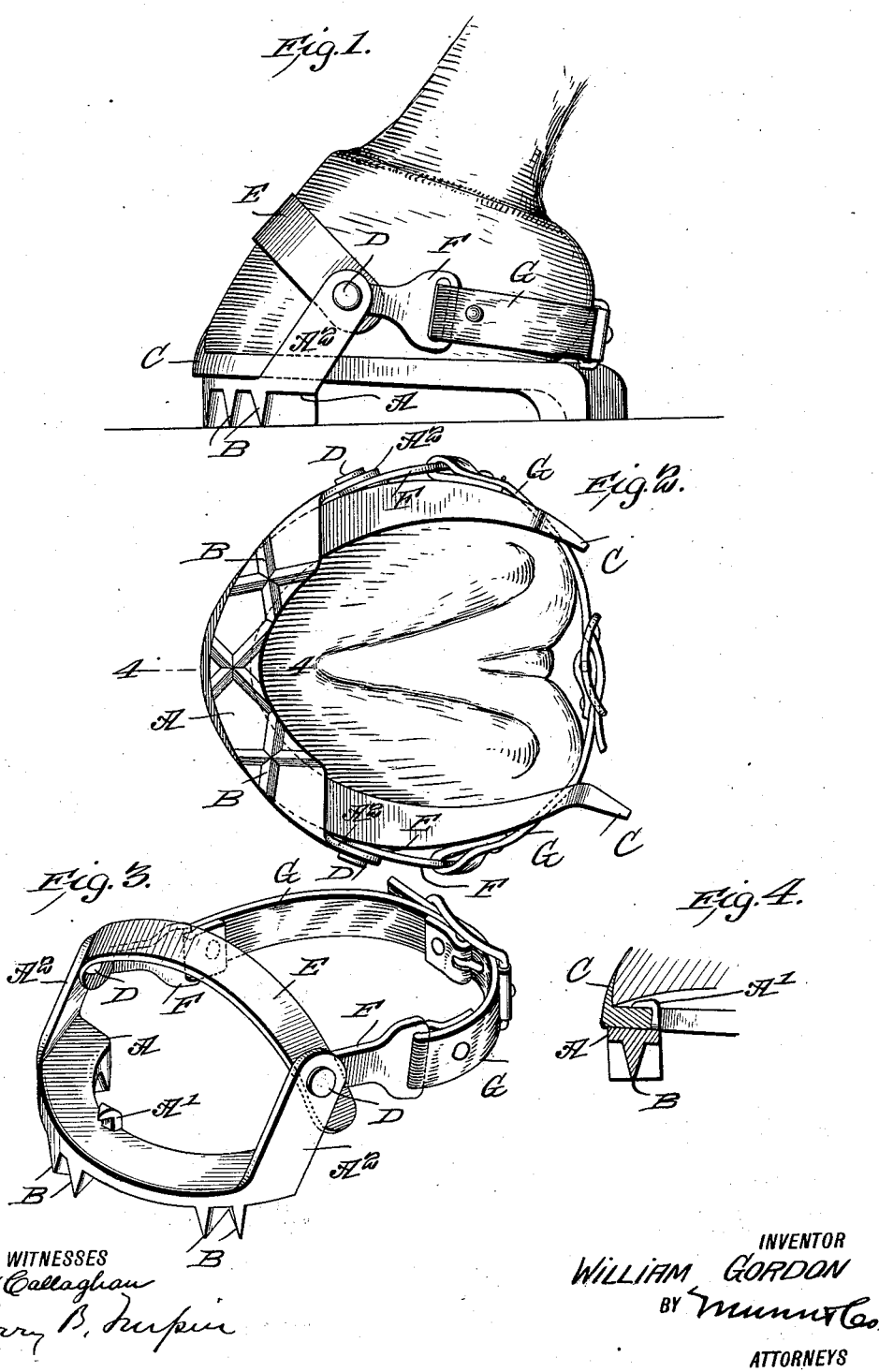
WITNESSES
INVENTOR
WILLIAM GORDON
BY
ATTORNEYS

UNITED STATES PATENT OFFICE.

WILLIAM GORDON, OF PHILADELPHIA, PENNSYLVANIA.

HORSESHOE-CALK.

1,046,287.  Specification of Letters Patent.  Patented Dec. 3, 1912.

Application filed January 20, 1912. Serial No. 672,354.

*To all whom it may concern:*

Be it known that I, WILLIAM GORDON, a citizen of the United States, and a resident of Philadelphia, in the county of Philadelphia and State of Pennsylvania, have invented certain new and useful Improvements in Horseshoe-Calks, of which the following is a specification.

This invention is an improvement in calk attachments for horseshoes and has for an object to provide a simple construction which can be easily applied to and removed from the horse's hoof and will, when in place, be securely held against displacement in any direction and will embody means which will aid in the adjustment of the attachment to hoofs of different sizes; and the invention consists in certain novel constructions and combinations of parts as will be hereinafter described and claimed.

In the drawing Figure 1 is a side view and Fig. 2 is a bottom plan view of the attachment as applied for use. Fig. 3 is a perspective view of the attachment removed from a hoof. Fig. 4 is a vertical section on about line 4—4 of Fig. 2.

The apparatus as shown comprises what for convenience of reference I term a calk bar A having on its underside suitable calks B and the bar A is preferably arched as best shown in Fig. 2 to conform generally to the toe portion of the shoe C to which it is applied. Manifestly this shoe may be of any suitable construction and the calk bar A is provided at its middle with an upwardly projecting lug A' which when the bar is applied to a shoe engages in rear of the toe portion of the shoe as best shown in Fig. 4 and prevents any forward displacement of the calk bar. At its ends, which terminate in advance of the wide portion of the shoe, the bar A is provided with upturned arms A² which incline slightly to the rear toward their upper ends and when applied rest flat against the hoof. These arms A² are provided near their upper ends with openings for the rivets D which coöperate in forming pivotal connections between the said arms A², the front strap E and the links F which will be more fully described.

It will be noticed that the arms A² inclining upwardly and rearwardly from the ends of the calk bar are inclined and rest in front of the wider portion of the hoof and conform to the hoof so that these arms prevent any rearward displacement of the calk bar and this action is aided by the front strap E in the practical use of the invention.

The strap E is preferably of sheet metal having sufficient spring and flexibility to enable it to conform closely to the front side of the hoof and this strap E is pivoted at its ends to the upper ends of the arms A² preferably on the rivets D as shown.

The links F are pivoted at their front ends to the upper ends of the arms A² preferably on the rivets D with the front ends of the links lying between the ends of the arms and the ends of the front strap E, the latter lying immediately next to the hoof as will be understood from the drawing. The links F extend rearwardly from their connection with the arms A² and are slotted at their rear ends to receive the strap devices G which extend between the said links and around the rear portion of the hoof lying immediately above the heel portions of the shoe and between the same and the hoof as best shown in Figs. 1 and 2 of the drawing. In applying the attachment to the animal's hoof, the prong A' may be engaged in rear of the toe of the shoe and the toe bar be then rocked to bring the arms A² back against the hoof to the position shown in Fig. 1.

When the device is applied to a hoof and shoe as shown and before described, it is manifest that the calk bar will be so anchored in position that it cannot be displaced forwardly because of the strap connections G and the lug A' and that it cannot be displaced rearwardly because of the arms A² and the front strap E so that the animal cannot kick the calk bar off nor can such calk bar be displaced either forward, rearwardly or laterally in either direction but will be held at all times firmly and securely in place.

The specific form of strap devices G may be preferred as they will readily conform to the shape and size of the rear portion of the hoof and will operate efficiently to secure the links and connected parts in place, but manifestly I do not desire, in the broad features of my invention, to be limited to the specific form of strap devices shown as these may be varied without departing from some of the broad principles of my invention. The pivotal connection of the front strap and of the links with the arms of the calk bar aid in securing a conformation of the attachment to the animal's hoof and thus not only add to the security of the attachment when in place, but also improve the appearance of the improvement when applied for use.

While the flexible and pivoted front strap and the pivoted links permit of a certain limited adjustment to adapt the device to hoofs of different sizes, within certain ranges, it will be understood that in practice I may make the attachments in different sizes to suit the requirements of the trade.

I claim:—

1. The attachment for horseshoes herein described, comprising a calk bar provided at its rear edge with an upwardly projecting lug to engage in rear of the toe portion of a horseshoe and having at its ends upwardly projecting arms inclining rearwardly toward their upper ends and adapted to lie flat against a horse's hoof in advance of the widest portion thereof, a front strap pivoted at its ends to the upper ends of the arms and arching between its ends to conform to and rest against a hoof, links pivoted at their front ends to the upper ends of the arms, such pivotal connection of the links and front strap aiding in conforming the attachment to a hoof and strap devices connecting the rear ends of the opposite links, all substantially as and for the purposes set forth.

2. A horseshoe attachment comprising a calk bar, arms extending upwardly therefrom, a toe strap pivoted at its ends to said arms, links pivoted at their forward ends to said arms and extending rearwardly therefrom, and securing means substantially as set forth.

3. A horseshoe attachment comprising a calk bar having means to engage with a shoe and prevent its forward displacement, said bar being provided at its ends with upwardly projecting bars inclining rearwardly toward their upper ends and adapted to lie against a hoof just in advance of the widest part thereof, a front strap between the upper ends of said arms and arching between its ends to conform to a hoof, and securing means substantially as set forth.

WILLIAM GORDON.

Witnesses:
J. BRYANT GORDON,
PERRY B. TURPIN.